(12) United States Patent
Asano et al.

(10) Patent No.: US 6,961,219 B2
(45) Date of Patent: Nov. 1, 2005

(54) DISK DRIVE HEAD POSITIONER WITH THIN-FILM AIR-FLOW ADJUSTING MECHANISM, THIN FILM MEMBER AND METHOD OF MANUFACTURING (75) Inventors: Tomoyuki Asano, Tokyo (JP); Ikuko Kawamoto, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 1 day.

(21) Appl. No.: 10/484,275

(22) PCT Filed: Jul. 22, 2002

(86) PCT No.: PCT/US02/23326

§ 371 (c)(1),
(2), (4) Date: Jan. 20, 2004

(87) PCT Pub. No.: WO03/021578

PCT Pub. Date: Mar. 13, 2003

(65) Prior Publication Data

US 2004/0174639 A1 Sep. 9, 2004

(30) Foreign Application Priority Data

Aug. 31, 2001 (JP) ............................. 2001-264525

(51) Int. Cl.[7] .............................................. G11B 5/55
(52) U.S. Cl. .................................................... 360/266
(58) Field of Search ............................ 360/266, 265.7

(56) References Cited

U.S. PATENT DOCUMENTS

| 4,339,777 | A | | 7/1982 | Gruczelak | |
| 4,821,130 | A | | 4/1989 | Bernett et al. | |
| 4,879,618 | A | | 11/1989 | Iida et al. | |
| 4,885,652 | A | | 12/1989 | Leonard et al. | |
| 4,986,496 | A | | 1/1991 | Marentic et al. | |
| 5,069,403 | A | | 12/1991 | Marentic et al. | |
| 5,133,516 | A | | 7/1992 | Marentic et al. | |
| 5,446,612 | A | | 8/1995 | Thornton et al. | |
| 5,801,905 | A | * | 9/1998 | Schirle et al. | 360/265.9 |
| 5,848,769 | A | | 12/1998 | Fronek et al. | |
| 5,854,725 | A | | 12/1998 | Lee | |
| 6,008,965 | A | | 12/1999 | Izumi et al. | |
| 6,310,749 | B1 | * | 10/2001 | Beatty et al. | 360/265.7 |
| 6,449,119 | B1 | | 9/2002 | Hashizume et al. | |
| 6,487,038 | B1 | | 11/2002 | Izumi et al. | |
| 6,597,540 | B2 | * | 7/2003 | Tsuda et al. | 360/265.9 |

FOREIGN PATENT DOCUMENTS

| JP | 54-154310 | 12/1979 |
| JP | 59-94273 | 5/1984 |
| JP | 63-119078 | 5/1988 |

(Continued)

Primary Examiner—A. J. Heinz (57) ABSTRACT

A disk drive (10) includes a plurality of thin-film members (36) for respectively covering the desired contour portions in a plurality of suspension arms (26) of an actuator (20). Each thin-film member (36) is fixedly attached to the surface of the suspension arm to cover the contour portion around a through hole (34) formed in the corresponding suspension arm (26) for reducing the moment of inertia, so as to cover the through hole. The thin-film member (36) substantially makes the contour portion around the through hole of the suspension arm (26) flush, and the air flow caused around the storage disks (16) rotating at high speed is guided smoothly along this contour portion. As a result, the air flow is stabilized, and the influences such as vibration on the actuator (20) are suppressed.

7 Claims, 6 Drawing Sheets

FOREIGN PATENT DOCUMENTS

| | | |
|---|---|---|
| JP | 5-100061 | 4/1993 |
| JP | 5-101557 | 4/1993 |
| JP | 11-073756 | 3/1999 |
| JP | 11-297037 | 10/1999 |
| JP | 2000-228079 | 8/2000 |
| JP | 2000-357385 | 12/2000 |

* cited by examiner

DISK DRIVE HEAD POSITIONER WITH THIN-FILM AIR-FLOW ADJUSTING MECHANISM, THIN FILM MEMBER AND METHOD OF MANUFACTURING

This application is a 371 of PCT/US02/23326 Jul. 22, 2002.

TECHNICAL FIELD OF THE INVENTION

The present invention relates to a disk drive for writing and reading data into and from a storage disk, and particularly to a disk drive having an air-flow adjusting mechanism for adjusting the air flow generated around the storage disk rotating at high speed. The present invention also relates to a method of producing such a disk drive. The present invention further relates to a thin-film member incorporated as an air-flow adjusting mechanism in such a disk drive.

BACKGROUND OF THE INVENTION

In a disk drive used as an auxiliary device for an information processing system, any of various disk-shaped storage media (referred to as the storage disk in this specification) such as a magnetic disk, an optical disk and a magneto-optic disk is rotated at high speed, while a head section is caused to perform the tracking operation following a multiplicity of recording tracks formed concentrically on the recording surface of the recording disk thereby to read and write data. The tracking performance of the head section depends on the positioning accuracy in the servo control operation of an actuator supporting the head section. Especially in recent years, with the remarkable increase in the recording density of the storage disk, demand has become considerably exacting for the positioning accuracy of the actuator.

For the actuator to perform the highly accurate tracking operation, the external disturbances affecting the operation of the actuator are required to be minimized. For example, the air flow generated around the storage disk in high-speed rotation becomes turbulent by bombarding the actuator and may cause vibration of the actuator and the storage disk. Especially in a configuration like a hard disk drive in which the actuator has a suspension arm extending along the recording surface of the storage disk and rotatable about a supporting shaft, the suspension arm is vibrated by the turbulent air flow and can adversely affect the positioning accuracy of the head and the dimensional accuracy of the gap between the head and the recording surface of the disk.

To cope with this problem, various disk drives have been proposed which include an air-flow adjusting mechanism for adjusting the air flow generated around the storage disk rotating at high speed. The specification of U.S. Pat. No. 5,854,725, for example, discloses a hard disk drive having a plurality of guide members mounted on the surface of the arm of the actuator. These guide members are each a small piece in the shape of a streamline or a wedge and are fixed on the upstream or downstream side of the arm surface by an adhesive or the like. Each guide member smoothly guides the air flow around the storage disk rotating at high speed, along the outer surface of the actuator arm, and thus converts the air flow into a laminar flow thereby reducing the effect that the vibration caused by the air flow has on the arm.

Also, the specification of U.S. Pat. No. 5,446,612 discloses a hard disk drive wherein a wing is formed on the arm of the actuator. The wing of the arm, receiving the air flow caused by the rotation of the storage disk, generates a force whereby the head at the forward end of the arm approaches the disk. As a result, the head bearing operation is stabilized and the dimensional accuracy of the gap between the head and the recording surface of the disk is improved.

Japanese Unexamined Patent Publication (Kokai) No. 2001-23347 discloses a hard disk drive having air rectification wings inserted between a plurality of storage disks and arranged at predetermined spatial intervals over the range of head movement downstream of the head at the forward end of the arm of the actuator in the direction of disk rotation. The air rectification wings have a streamlined section for rectifying the air flow between the disks in the vicinity of the arm and thus suppresses the vibration of the disk and the arm. In similar fashion, Japanese Unexamined Patent Publication (Kokai) No. 2000-228079 discloses a hard disk drive having comb-shaped rectification members inserted between a plurality of arms of the actuator.

Also, Japanese Unexamined Patent Publication (Kokai) Nos. 5-101557 and 5-100061 disclose a hard disk drive for reducing the shock at the time of starting or stopping the operation of the arm, by mounting an elastic member or a buffer member on the arm of the actuator or covering the arm rotation shaft with a damping member.

In the conventional hard disk drive, for example, a through hole or a notch is generally formed at a predetermined position of the arm to reduce the weight of the suspension arm and thus to reduce the moment of inertia of the suspension arm when the actuator is in operation. With this configuration, the through hole or the notch, as the case may be, causes a great turbulent air flow along the outer surface of the suspension arm, which in combination with the reduced weight of the suspension arm, may vibrate the suspension arm more readily.

In the various conventional air-flow adjusting mechanisms described above, it is difficult to directly suppress the turbulence of the air flow caused by the through hole or the notch formed in the suspension arm in order to reduce the moment of inertia. Further, with the increase in the number of suspension arms, the configuration of the air-flow adjusting mechanism is more complicated, with the result that the manufacturing process may be complicated or the production cost may increase. Also, it may be that the air-flow adjusting mechanism described above fails to work effectively on the other disk drives having no suspension arm.

An object of the present invention is to provide a disk drive for writing and reading data into and from a storage disk, comprising an inexpensive and easily mountable air-flow adjusting mechanism for adjusting the air flow caused around the storage disk rotating at high speed, and thus capable of suppressing, among others, the effect that the vibration caused by the air flow has on the actuator.

Another object of the invention is to provide a disk drive comprising a suspension arm extending along the recording surface of a storage disk and rotatable about a supporting shaft and an air-flow adjusting mechanism capable of directly preventing the turbulence of the air flow caused by the through hole or the notch formed in the suspension arm to reduce the moment of inertia.

Still another object of the invention is to provide a method of producing such a disk drive easily at low cost. A further object of the invention is to provide a thin-film member capable of being incorporated, as an air-flow adjusting mechanism, in a disk drive.

SUMMARY OF THE INVENTION

In one aspect, the invention provides a disk drive comprising a rotatable storage disk having a recording surface; an actuator carrying a head section to be opposed to the recording surface of the storage disk and causing the head section to perform a tracking operation relative to the recording surface; and an air-flow adjusting mechanism for adjusting an air flow generated around the storage disk due to a rotation of the storage disk; wherein the air-flow adjusting mechanism includes a thin-film member fixedly attached to a surface of the actuator to cover a desired contour portion of the actuator, and the thin-film member acts to stabilize the air flow along the contour portion.

The actuator typically will include a pivotable suspension arm extending along the recording surface of the storage disk with the thin-film member attached to a surface of the suspension arm to cover a contour portion of the suspension arm. A through hole is formed in the contour portion of the suspension arm, and the thin-film member covers the through hole. The thin-film member may comprise a tubular heat-shrinkable resinous film layer attached to the surface of the actuator by a heat shrinkage of the heat-shrinkable resinous film layer. Alternatively, the thin-film is a resinous film layer with an adhesive layer attached to one surface of the resinous film layer, the thin-film member fixedly attached to the surface of the actuator through the adhesive layer. The thin-film member includes a vibration damping polymer layer for reducing vibration and/or shock levels of the actuator.

An airflow adjusting mechanism is also provided with a surface for reducing vibration impact force between a casing of the disk drive and the storage disk by reducing peak shock or vibration levels as caused by an impact to the casing. The airflow adjusting mechanism is also provided with at least one function selected from an anti-static function, a bias regulating function, an electromagnetic-interference shielding function and a radio-frequency-interference shielding function, for the disk drive.

In another aspect, the invention provides a method of providing a disk drive having an air-flow adjusting mechanism for adjusting an air flow generated around a storage disk in rotation, the method comprising (i) providing an actuator carrying a head section opposed to a recording surface of a storage disk; (ii) providing a heat-shrinkable thin-film member that is shaped and dimensioned to enable the thin-film member to cover a desired contour portion of the actuator after heat shrinkage of the thin-film member; (iii) arranging the thin-film member at a position for covering the contour portion of the actuator; and (iv) heating the thin-film member to shrink, so as to fixedly attach the thin-film member to a surface of the actuator while covering the contour portion of the actuator.

In still another aspect, the invention provides a thin-film member incorporated, as an air-flow adjusting mechanism, in a disk drive as set forth herein.

BRIEF DESCRIPTION OF THE DRAWINGS

FIG. 4 is a diagram for explaining a method of fabricating a disk drive according to an embodiment of the invention, in which (a) is a plan view before the state of the thin-film member before shrinkage, and (b) the state of the thin-film member after shrinkage.

DETAILED DESCRIPTION OF THE PREFERRED EMBODIMENT

The preferred embodiment of the present invention will be explained in detail below with reference to the accompanying drawings. In the drawings, the same component elements are designated by the same reference numerals, respectively.

Figure 1:
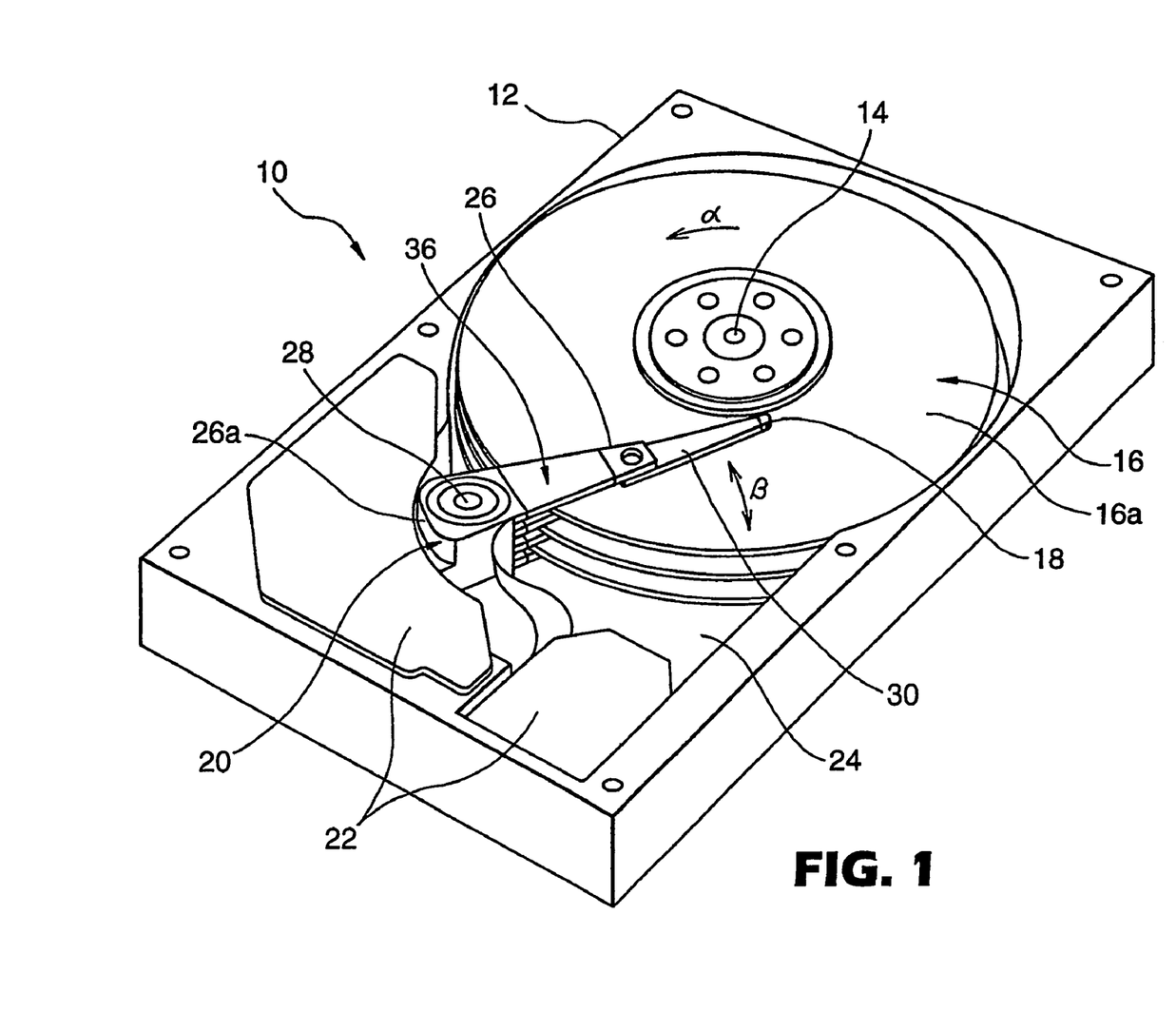
FIG. 1 is a perspective view showing a disk drive according to a first embodiment of the invention with the casing cover removed.
Figure 2:
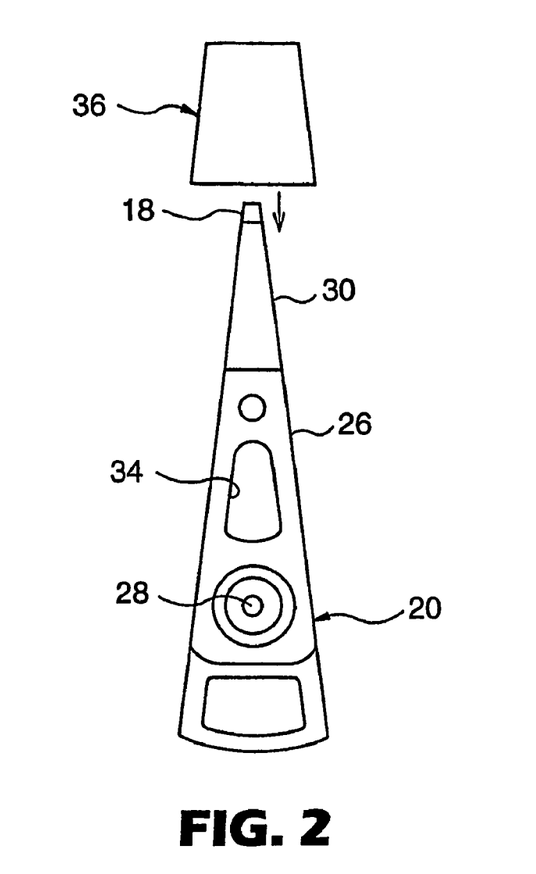
FIG. 2 is an exploded plan view showing the actuator and the thin-film member of the disk drive of FIG. 1.

Referring to the drawings, FIG. 1 is a perspective view showing a disk drive 10 according to an embodiment of the invention with the casing cover thereof removed, and FIG. 2 is an exploded plan view showing the essential parts of the actuator of the disk drive 10. The disk drive 10 has a configuration of a hard disk unit used as an auxiliary storage unit of an information processing system such as a personal computer.

The disk drive 10 comprises a casing 12, a plurality of (three in the drawing) storage disks 16 arranged rotatably about a common drive shaft 14 in the casing 12 and each having a recording surface 16a, a drive source (not shown) for rotationally driving the storage disks 16. An actuator 20 is movably arranged in the casing 12 in the vicinity of the storage disks 16 for supporting a plurality of head sections 18 in opposed relation to the recording surface 16a of the storage disks 16 and the actuator activating the head sections 18 to perform the tracking operation following the recording surface 16a, and a servo mechanism 22 for driving the actuator 20.

The casing 12 has a rigid structure fabricated of a metal material, for example, through the casting process and has a bottomed recess 24 for stably accommodating the above-mentioned main essential parts of the disk drive 10. A cover (not shown) for covering the recess 24 is mounted on the casing 12 with the main essential parts accommodated in the recess 24.

The storage disks 16 are magnetic disks having a recording surface 16a on the two surfaces thereof, and each recording surface 16a is formed with a multiplicity of recording tracks (not shown) concentrically about the rotation axis. The plurality of the storage disks 16 are mounted fixedly on a common drive shaft 14 at predetermined intervals along the axis, and rotated (in the direction indicated by arrow α) at high speed in synchronism with each other by the driving action of a drive source.

Figure 5:
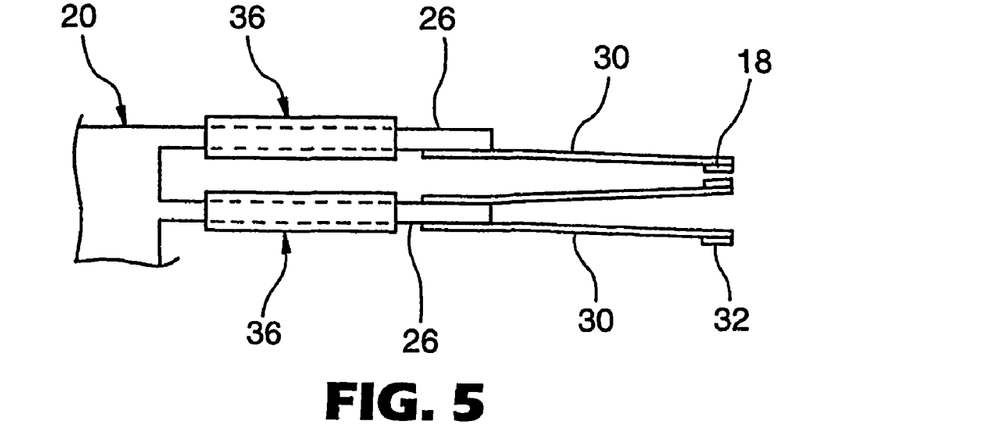
FIG. 5 is a partly enlarged side view of the actuator with the thin-film member fixed at a predetermined position in FIG. 3.

The actuator 20 includes a plurality of (four in the drawing) suspension arms 26 each extending along the recording surface 16a of the storage disk 16 and rotatable about a supporting shaft. The suspension arms 26 are coupled integrally to each other at the base ends thereof and the integrally coupled portions 26a are mounted on a common shaft 28. The end of each suspension arm 26 is coupled with a head supporting plate 30, like a spring plate, and a slider 32 (see FIG. 5) making up the head section 18 carried at an end of each head supporting plate 30. The plurality of suspension arms 26 are rotated about the shaft 28 in synchronism with each other over a predetermined angular range (in the direction indicated by arrow β) by the driving action of a servo mechanism 22. As a result, the head section 18 at the forward end of the head supporting plate 30 coupled to each suspension arm 26 performs the tracking operation on the recording tracks set on the recording surface 16a of the corresponding storage disk 16 thereby to write or read the data into or from the recording surface 16a.

The actuator 29 is formed with a through hole 34 (FIG. 2) at about the central portion of each suspension arm 26 to reduce the weight of each arm 28 and thereby to reduce the moment of inertia of the plurality of the suspension arms 28 in operation. With this configuration, the air flow generated around the plurality of the recording disks 16 rotating at high speed at the time of the actuator operation, i.e. at the time of reading or writing data bombards the plurality of the suspension arms 26 of the actuator 20 while at the same time causing a great turbulent flow at the position of the through hole 34 of each arm 26 resulting in the likelihood of causing a vibration not negligible of the suspension arms 26. In view of this, the disk drive 10 is equipped with an air-flow adjusting mechanism having the following configurational features whereby the effect that the vibration or the like caused by the air flow, in particular, has on the actuator 20 can be effectively suppressed.

The air-flow adjusting mechanism of the disk drive 10 includes a plurality of thin-film members 36 for covering the desired contour portion of the plurality of the suspension arms 26 of the actuator 20. Each thin-film member 36 surrounds the contour portion around the through hole 34 of the corresponding suspension arm 26 over the two surfaces of the arm and is fixed on the main surface of the suspension arm 26 thereby to cover the through hole 34 on the two surfaces of the arm. The thin-film member 36 having this configuration smoothes the contour portion around the through hole substantially and functions to guide the air flow smoothly along the contour portion thereby to stabilize the air flow substantially into a laminar flow. As a result, the effect that the vibration or the like caused by the air flow has on the actuator 20 can be very effectively suppressed. Also, the above-mentioned configuration in which the thin-film member 36 having a simple structure is fixed at the desired position of the suspension arm 26 contributes to the simplification of the production process and a reduced production cost of the disk drive 10.

Figure 3:
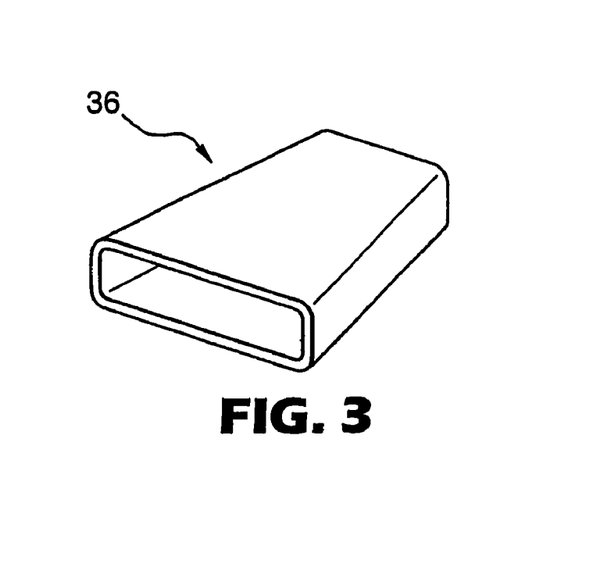
FIG. 3 is a perspective view showing the thin-film member of FIG. 2 in enlarged form.

The thin-film member 36, as shown in FIG. 3, has a substantially trapezoidal hollow cylindrical structure in plan view corresponding to the contour around the through hole 34 of the suspension arm 26. With this structure, even in the configuration of the shown embodiment in which the actuator 20 has a plurality of the suspension arms 26, the thin-film member 36 can be easily mounted at the desired position of the corresponding suspension arm 26 by inserting, the forward end first of the head supporting plate 39 coupled to the suspension arm 26, into the hollow portion of the thin-film member 36.

The hollow cylindrical thin-film member 36 can be fixed on the surface of the suspension arm 26 through, for example, an adhesive. For simplifying the work of fixing the thin-film member 36, however, the thin-film member 36 is advantageously configured to have a cylindrical heat-shrinkable resinous film layer. In this configuration, the thin-film member 36 can be very easily fixed on the surface of the suspension arm 26 by the heat shrinkage of the heat-shrinkable resinous film layer. Incidentally, the whole of the thin-film member 36 may be formed of a heat-shrinkable resinous film layer or the thin-film member 36 can be formed as a multilayer structure including a heat-shrinkable resinous film layer. In any case, the thin-film member 36 is formed of a resin material by which the weight can be easily reduced to suppress the increase in the moment of inertia of the suspension arm 26.

The thin-film member 36 having a cylindrical heat-shrinkable resinous film layer is fixed on the suspension arm 26 of the actuator 20 by following the procedures described below.

Figure 4A:
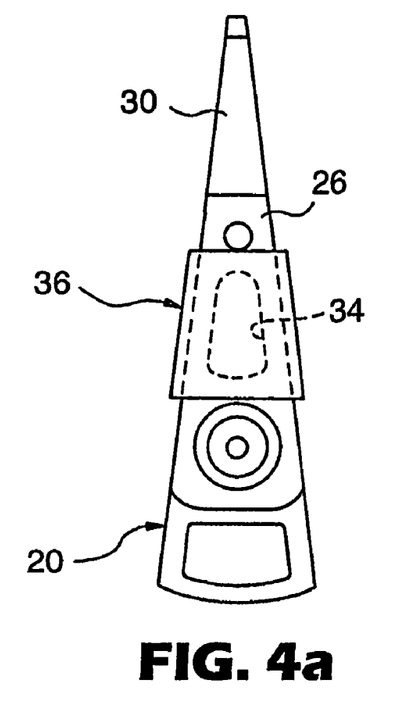
Figure 4B:
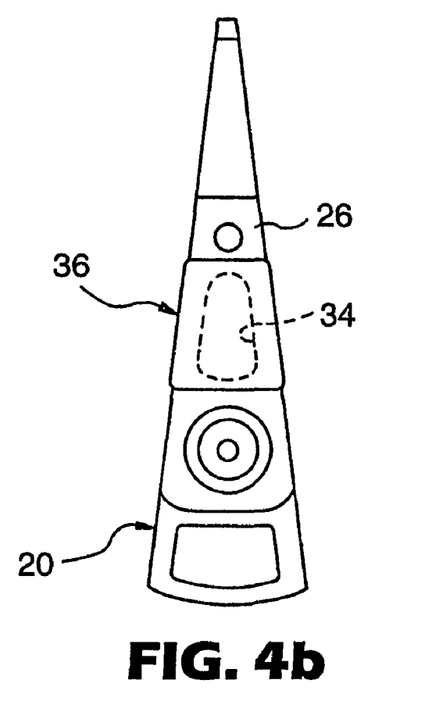

First, an actuator 20 having a suspension arm 26 for supporting the head section 18 is prepared, while at the same time preparing a thin-film member 36 having the original size and the original shape that can cover, after heat shrinkage, the contour portion around the through hole 34 of the suspension arm 26 (FIG. 2). Then, the head supporting plate 30 coupled to the suspension arm 26 is inserted, the forward end thereof first, into the hollow portion of the thin-film member 36, and the thin-film member 36 is arranged at a position surrounding the contour portion around the through hole 34 of the suspension arm 26 (FIG. 4(a)). By shrinking the thin-film member 36 by heating it to a predetermined temperature, the thin-film member 36 is fixed on the surface of the suspension arm 26 with the contour portion around the through hole 34 covered while at the same time covering the through hole 34 (FIG. 4(b)).

The oriented polyester film having the trade name "HISHIPET" or the oriented polystyrene film having the trade name "DXL" that can be acquired from Mitsubishi Resin (Tokyo, Japan) can be cited as an example of a material suitably used for the heat-shrinkable resinous film layer of the thin-film member 36. In this case, the "HISHIPET" film having a thickness of 30 micrometers ($\mu$m) to 50 $\mu$m or the "DXL" film having a thickness of 40 $\mu$m to 80 $\mu$m can be acquired. Either material can obtain a superior shrinkage/fixing function by being heated to the temperature range of about 100° C. to 160° C. in the fixing process of the thin-film member 36 described above. In the case where the disk drive 10 is exposed to about this temperature in a predetermined step of the production process, the heating step intended solely for heat shrinkage of the thin-film member 36 can be eliminated by arranging the thin-film member 36 not yet shrunk at a predetermined position of the suspension am 26 as described above before the otherwise required heating step.

Figure 6:
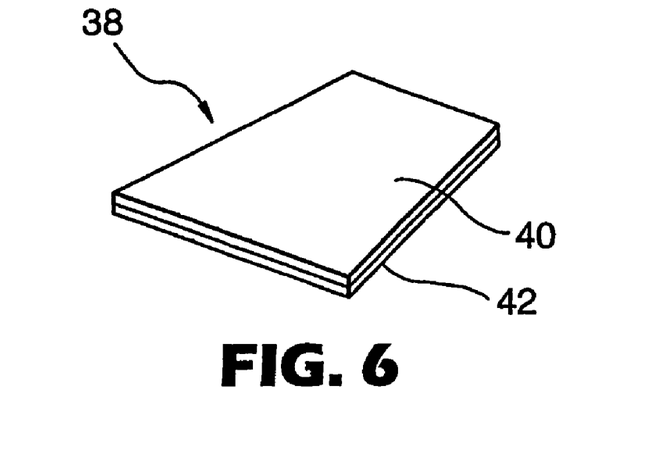
FIG. 6 is an enlarged perspective view of the thin-film member according to another embodiment of the invention.

In the air-flow adjusting mechanism of the disk drive 10, a tabular thin-film member 38 shown in FIG. 6 can be employed in place of the hollow thin-film member 36 described above. In such a case, the thin-film member 38 includes a substantially trapezoidal resinous film layer 40 in plan view conforming with the contour around the through hole 34 of the suspension arm 26 and an adhesive film layer 42 attached to one surface of the resinous film layer 40.

Figure 7:
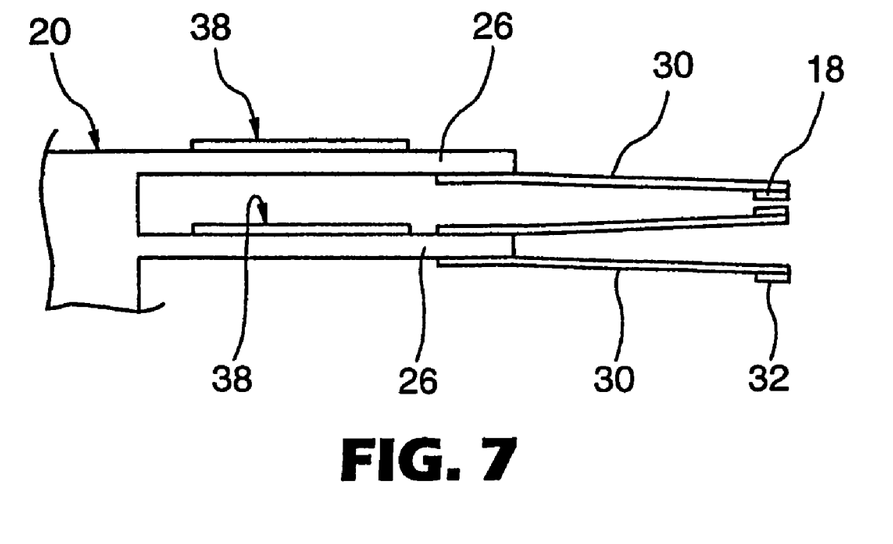
FIG. 7 is a partly enlarged side view of the actuator with the thin-film member fixed at a predetermined position in FIG. 6.

The thin-film member 38 is fixed on the surface of the suspension arm 26 through the adhesive layer 42 while covering the contour portion around the through hole 34 of the suspension arm 26 preferably on one surface (the upper surface in FIG. 7) of the arm. Also with the thin-film member 38 having this configuration, the contour portion around the through hole 34 can be substantially smoothed by covering the through hole 34 of the suspension arm 26 on one surface of the arm. As a result, the air flow along this contour portion is smoothly guided and stabilized substantially into a laminar flow. Thus, the effect that the vibration or the like caused by the air flow has on the actuator 20 can be very effectively suppressed. By the way, the thin-film member 38 can alternatively be fixed on the two surfaces of the suspension arm 26.

The material of resinous film layer 40 of the thin-film member 38 is not limited, but a film made of, e.g., polyethylene terephthalate (PET), polypropylene, polyethylene or polyimide may be employed. Also, the adhesive layer 42 may be made of a general type of a pressure sensitive adhesive, and preferably of an acrylic adhesive. In this case, it is preferable to use the PET resinous film layer 40 having a thickness of 25 $\mu$m to 100 $\mu$M and the adhesive layer 42 having a thickness of 25 $\mu$m to 100 $\mu$m in an appropriate combination.

Figure 8:
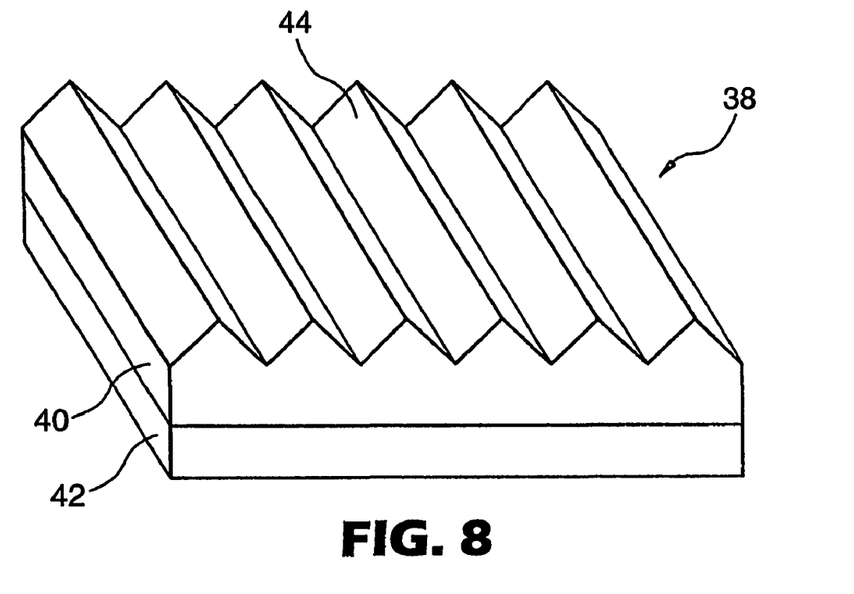
FIG. 8 is an enlarged perspective view of the thin-film member according to a modification.
Figure 9:
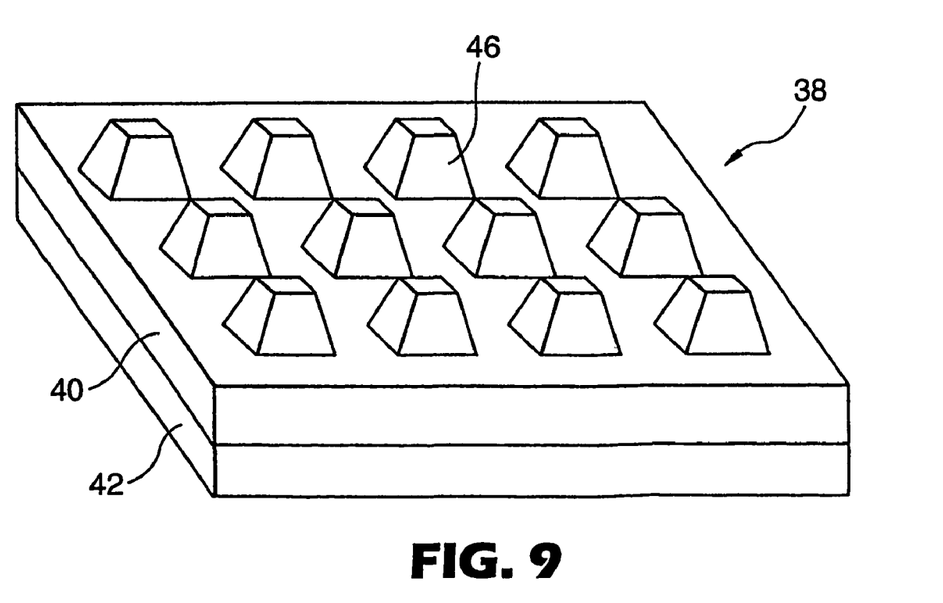
FIG. 9 is an enlarged perspective view of the thin-film member according to another modification.
Figure 10A:
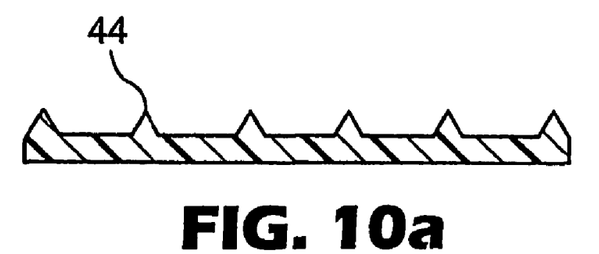
FIGS. 10(a) to (e) are enlarged sectional views of the thin-film member according to still other modifications.
Figure 10B:
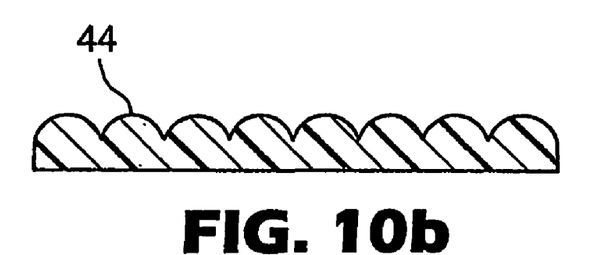
Figure 10C:
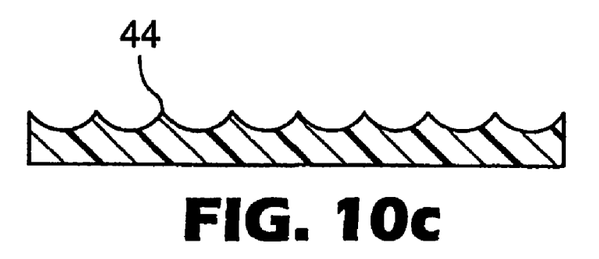
Figure 10D:
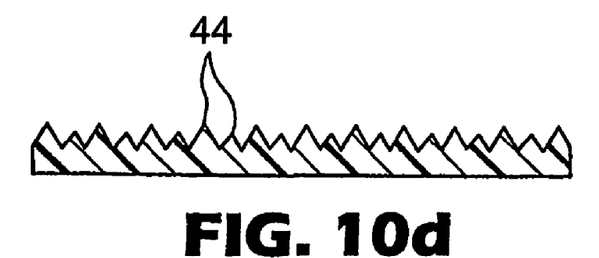
Figure 10E:
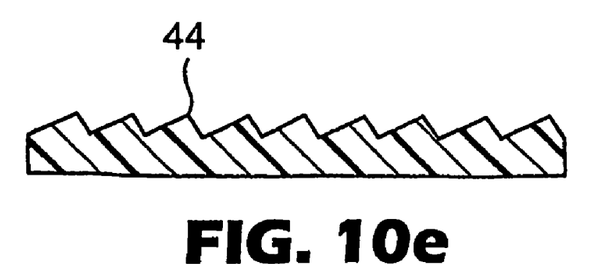

For the resinous film layer 40 of the thin-film member 38, not only a film having a smooth main surface on the other side of the adhesive layer 42 but a film having minute unevennesses on the main surface can be employed. Such a film may be a film having a multiplicity of minute ridges 44 shown in FIG. 8 or a film having a multiplicity of minute protrusions 46 shown in FIG. 9. In any case, the unevenness on the main surface of the resinous film layer 40 exhibits the above-mentioned function of rectifying the air flow caused around the storage disks 16 rotating at high speed, by fixing the thin-film member 38 in the proper direction on the surface of the suspension arm 26. As a result, the stabilization of the air flow is promoted, and the effect that the vibration or the like caused by the air flow has on the actuator 20 is suppressed even more effectively.

As other examples of the minute ridges 44 formed preferably on the resinous film layer 40, the shapes shown in the sectional views of FIGS. 10(*a*) to (*e*) can be cited, which are disclosed in U.S. Pat. Nos. 4,986,496, 5,069,403, 5,133,516 and 5,848,769. With the minute ridges 44 of various shapes shown in FIGS. 8 to 10, the height of each ridge 44 (distance from the base end to the top) is preferably 20 $\mu$m to 400 $\mu$m, the angle at the crossing of the V-shaped base end (i.e. the valley) is preferably 15° to 140°, and the interval between the tops of adjacent ridges 44 is preferably 20 $\mu$m to 400 $\mu$m. The minute ridges 44 in any of these shapes can exhibit the function of rectifying the air flow effectively by securing the proper directivity of the thin-film member 38 on the surface of the actuator 20.

For the adhesive layer 42 of the thin-film member 38, a viscoelastic damping tape that can be acquired in the trade name of "Scotch Damp" (Model JPV115 or 242F01) from Minnesota Mining & Manufacturing (Minnesota, USA) can be employed, instead of the general type of a pressure sensitive adhesive. In such a case, the adhesive layer 42 itself can also exhibit the damping effect as a vibration damping polymer layer, and therefore the vibration and/or shock levels of the actuator 20 can be suppressed even more effectively.

Preferable embodiments of the invention have been described above. The present invention, however, is not limited to the configurations of the shown embodiments, but can be variously modified or changed without departing from the scope of the claims. For example, the disk drive and the method of manufacturing it according to the present invention are applicable to disk drives having storage disks such as the optical disk or the magneto-optic disk other than the magnetic disk. Also, for the disk drive having a direct acting actuator having no suspension arm, for example, the effect that the air flow has on the actuator can be effectively suppressed by employing a thin-film member fixed on the surface of the actuator by covering the desired contour portion of the actuator as an air-flow adjusting mechanism. Further, instead of the through hole, various contour portions of the actuator having a notch or a step or the like liable to cause a turbulent air flow can be covered with the thin-film member.

The airflow adjusting mechanism in the present invention may also be provided with a surface for reducing vibration impact force between a casing of the disk drive and the storage disk by reducing peak shock or vibration levels as caused by an impact to the casing. Moreover, the airflow adjusting mechanism may also be provided with at least one function selected from an anti-static function, a bias regulating function, an electromagnetic-interference shielding function and a radio-frequency-interference shielding function, for the disk drive.

EXAMPLE

In a 8.89 cm (3.5-inch) hard disk drive having the basic configuration shown in FIG. 1, the storage disks 16 were rotated at the speed of 10000 rpm, and the vibration in vertical direction (along the axis of the drive shaft 28) caused in the suspension arm 26 located at the upper end was measured with a laser displacement meter for both the structure according to this invention (FIG. 7) having the thin-film member 38 mounted on the upper surface of each suspension arm 26 and the conventional structure lacking the thin-film member 38. As a result, the vibration of 46.83 $\mu$m developed in vertical direction for the suspension arm 26 at the upper end of the conventional structure, while the vibration amplitude was suppressed to 15.47 $\mu$m for the structure according to this invention.

As evident from the foregoing description, according to this invention, there is provided a disk drive for writing and reading data into and from storage disks, wherein a highly reliable air-flow adjusting mechanism can be mounted inexpensively and easily which is capable of effectively suppressing especially the effect that the vibration caused by the air flow has on the storage disks, by adjusting the air flow caused around the storage disks rotating at high speed.

Especially, with a disk drive having a suspension arm extending along the recording surface of the storage disks and rotatable about a supporting shaft, the turbulence of the air flow caused by the through hole or the notch, formed in the suspension arm to reduce the moment of inertia can be directly prevented.

What is claimed is:
1. A disk drive comprising:
a rotatable storage disk having a recording surface;
an actuator carrying a head section to be opposed to said recording surface of said storage disk and causing said head section to perform a tracking operation relative to said recording surface; and
an air-flow adjusting mechanism for adjusting an air flow generated around said storage disk due to a rotation of said storage disk, said air-flow adjusting mechanism comprising a thin-film member attached to a surface of said actuator to cover a desired contour portion of said actuator, said thin-film member acting to stabilize the air flow along said contour portion wherein said thin-film member includes a tubular heat-shrinkable resinous film layer, said thin-film member being fixedly attached to the surface of said actuator by a heat shrinkage of said heat-shrinkable resinous film layer.

2. The disk drive of claim 1, wherein said actuator includes a pivotable suspension arm extending along said recording surface of said storage disk, and wherein said thin-film member is fixedly attached to a surface of said suspension arm to cover a contour portion of said suspension arm.

3. The disk drive of claim 2, wherein a through hole is formed in said contour portion of said suspension arm, and wherein said thin-film member covers said through hole.

4. The disk drive of claim 1, wherein said thin-film member includes a resinous film layer and an adhesive layer attached to one surface of said resinous film layer, said thin-film member being fixedly attached to the surface of said actuator through said adhesive layer.

5. The disk drive of claim 1, wherein said thin-film member includes a vibration damping polymer layer for reducing vibration and/or shock levels of said actuator.

6. A thin-film member incorporated, as an air-flow adjusting mechanism, in a disk drive of claim 1.

7. A method of producing a disk drive including an air-flow adjusting mechanism for adjusting an air flow generated around a storage disk in rotation, comprising:

(i) providing an actuator carrying a head section so as to be opposed to a recording surface of a storage disk;

(ii) providing a heat-shrinkable thin-film member having a shape and a dimension for enabling said thin-film member to cover a desired contour portion of said actuator after a heat shrinkage of said thin-film member;

(iii) arranging said thin-film member at a position for covering said contour portion of said actuator; and (iv) heating said thin-film member to shrink, so as to fixedly attach said thin-film member to a surface of said actuator while covering said contour portion of said actuator.

* * * * *